United States Patent Office 2,849,670
Patented Aug. 26, 1958

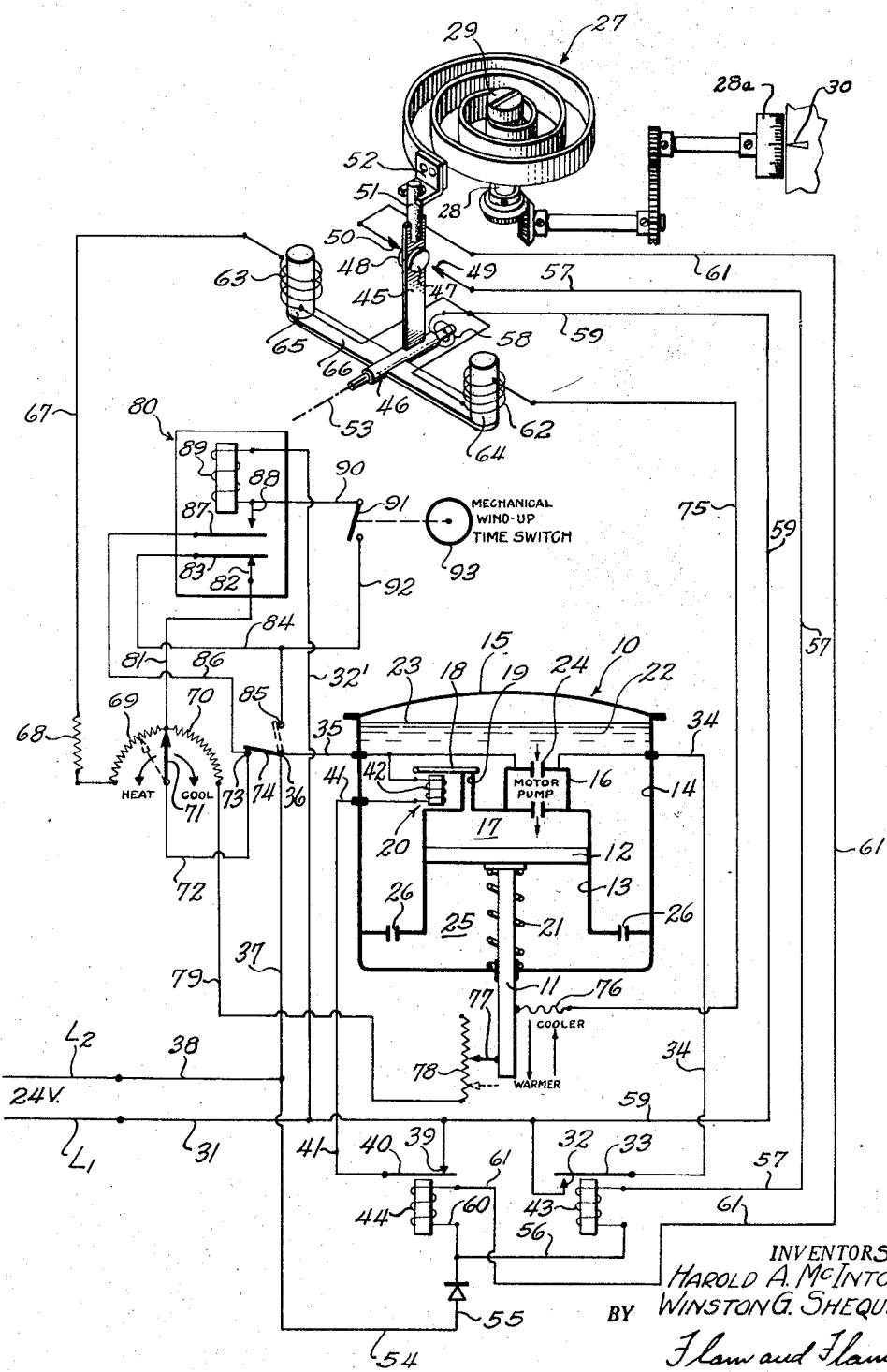

2,849,670

FOLLOW-UP CONTROL SYSTEM

Harold A. McIntosh, Los Angeles, and Winston G. Shequen, La Crescenta, Calif., assignors to General Controls Co., Glendale, Calif., a corporation of California Application May 21, 1956, Serial No. 586,213

3 Claims. (Cl. 318—32)

This invention relates to a control device including a sensing mechanism responsive to a change in condition and an operator or actuator for positioning a load to correct the condition. More particularly, the invention relates to a system of this character in which the load is positioned in accordance with the extent of deviation of a condition from a given norm or desired condition.

The invention is useful, for example, in connection with a temperature control system whereby the rate of heating or cooling is dependent upon the deviation from the desired room temperature. By the aid of a control device of this character, improved temperature stability is achieved.

An object of this invention is to provide an improved mechanism of this general character.

A further object of this invention is to provide a novel structure on which the setting of the sensing device can be adjusted either at a place remote from the sensing device or at the sensing device.

Another object of this invention is to provide a simple timer mechanism by which the setting of the sensing device can be changed for a definite interval.

Still another object of this invention is to provide a thermostat control system in which the movable element of the thermostat may be continuously subjected to stress in one direction whereby hysteresis effects are avoided and sensitivity and accuracy correspondingly increased.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawing:

The single figure is a diagrammatic view illustrating the system incorporating the present invention.

Diagrammatically illustrated in the figure is a load positioning device 10 having an operator or actuator 11 that is connected to the load (not shown). Downward movement of the operator 11 may, for example, cause increased opening of a valve controlling the flow of fuel to a furnace or the like. Or, if cooling is required, upward movement of the operator 11 may cause increased opening of a valve controlling the flow of the cooling medium.

In this instance, the operator 11 is affixed to a piston 12 movable in a cylinder 13. The cylinder 13 is supported in a casing 14 closed by a cover 15. A motor operated pump 16 in the casing 14 operates to urge fluid under pressure from the reservoir provided by the casing 14 into the space 17 above the piston 12. A closure 18 is normally urged to close a relief port 19 from the space 17 by the aid of an electromagnet structure 20.

For moving the piston 12 and operator 11 downwardly, the pump 16 is operated and the electromagnet device 20 energized. For holding the piston 12 and the operator 11 in any position, fluid is trapped in the cylinder space. Thus, the motor operated pump 16 is deenergized, but the electromagnet device 20 is energized to close the relief port 19. To permit the piston 12 and operator 11 to move upwardly, the electromagnet device 20 is deenergized. A return spring 21 ensures upward movement of the piston 12.

The casing 14 contains a suitable operating fluid or liquid 22 that has a level 23 normally above the inlet 24 of the motor operated pump 16. The space 25 beneath the piston 12 is in communication with the reservoir formed by the casing 14, as by the aid of ports 26.

A thermostat, including for example a coiled bimetal member 27, controls the energization circuits for the pump 16 and the electromagnet 20. The bimetal 27 is adjustably secured to a shaft 28, as by the aid of a calibration screw 29. A gear train couples the shaft to a rotatable drum 28a having a dial cooperable with a stationary pointer 30 for indicating the setting of the thermostat.

The motor operated pump 16 has an energization circuit including a conductor 31 connected to one line $L_1$ of a two-wire source, a contact 32 of a normally open relay switch, a contact arm 33 of the relay switch, a connection 34, the pump 16, connection 35, a terminal 36 the purpose of which will be described hereinafter, connections 37 and 38, to the other line $L_2$ of a two-wire source.

The electromagnet 20 controlling the relief port 19 has an energization circuit as follows: line $L_1$, the connection 31, a contact 39 of a normally closed relay switch paralleling the other relay switch 32—33, the contact arm 40 of the relay switch, a connection 41, coil 42 of the electromagnet 20, connection 35, terminal 36 and connections 37 and 38, to the other line $L_2$.

Relay coils 43 and 44, which are preferably of the direct current type, respectively control the switches 32—33 and 39—40 and are operated by circuit controllers associated with the free end of the bimetal 27.

A contact carrying arm 45 extends radially from a shaft 46 pivotally mounted for rotation about its axis by suitable means (not shown). This arm may be made of thin flexible metal, capable of exerting a resilient force.

Near the free end of the arm are contacts 47 and 48 respectively engageable with relatively stationary opposing contacts 49 and 50. These contacts may be adjustable toward and from each other. The end of the arm 45 carries a short post 51 of insulation material projecting between transversely extending arms of a bracket 52 secured to the free end of the bimetal 27. As the bimetal 27 contracts, corresponding to cooling, the bracket 52, acting through the post 51, moves the arm 45 in a clockwise direction about the axis 53 of the shaft 46 to cause engagement of the contact 47 with the stationary contact 49. This energizes the relay coil 43 to cause the pump 16 to function. The circuit for the relay coil 43 is completed as follows: line $L_2$, connection 38, a connection 54, rectifier 55, connection 56, coil 43, connection 57, stationary thermostat contact 49, movable thermostat contact 47, arm 45, shaft 46, a flexible connection 58, connections 59 and 31, to the other line $L_1$. Pump 16 now operates, and liquid under pressure is passed to the cylinder space 17.

Downward movement of the piston 12 and operator or actuator 11 causes a load to be so positioned as to correct the condition that causes the bimetal 27 to cool.

Engagement of the other contact 48 of the arm 45 with the stationary contact 50 takes place upon reverse movement of the free end of the bimetal 27, corresponding to an increased temperature to which the thermostat is subjected. Engagement of thermostat contacts 48 and 50 causes an energization circuit for the coil 44 to release the trapped fluid as follows: line $L_2$, connections 38 and 54, rectifier 55, connection 60, coil 44, connection 61, contacts 50 and 48, arm 45, shaft 46, flexible connection 58, connections 59 and 31, to the other line $L_1$. Energization of the coil 44 opens the circuit for the electromagnet 20, and the space 17 above the piston 12 is vented. Upward movement of the operator 11 corrects the condition which caused the bimetal 27 to move in a direction so as to bring the contacts 48 and 50 into engagement.

The operator 11 is positioned in accordance with the force exerted by the bimetal 27 on the flexible arm 45. Thus, if the force on the arm 45 tending to engage the contacts 47 and 49 is substantial, representing a substantial temperature drop below the desired temperature, the operator 11 is so positioned as to provide a rate of heating corresponding to the deviation of temperature from the desired norm. To accomplish this purpose, electromagnet coils 62 and 63 are provided that exert a turning torque upon the shaft 46 in amounts and directions dependent upon the position of the operator 11. This is achieved by a follow-up potentiometer 77—78 positioned by the operator 11 that determines the current in one of the coils 62. The stationary coils 62 and 63 cooperate with movable cores 64 and 65 symmetrically mounted upon opposite ends of a tilting cross beam 66 secured to the shaft 46.

The coil 63 is supplied with current through a circuit traced as follows: one of the lines $L_1$, connections 31 and 59, coil 63, a connection 67, a limiting resistor 68, all or part of series connected potentiometer elements 69 and 70, a center tap 71, connection 72, a contact 73, a movable switch arm 74 of a double throw switch that is connected to the terminal 36, terminal 36, connections 37 and 38, to the other line $L_2$.

The other coil 62 has an energization circuit as follows: one of the line $L_1$, connections 31 and 59, coil 62, a connection 75, a flexible connection 76 mounted upon the operator 11, a potentiometer tap 77 also mounted upon the operator 11, part or all of a potentiometer resistance 78, connection 79, through all or part of series connected potentiometer resistors 70 and 69, the tap 71, connection 72, contact 73, switch arm 74, terminal 36, connections 37 and 38, to the other line $L_2$.

The coil 63 exerts a clockwise torque on the shaft 46, and the coil 62 exerts a counterclockwise torque on the shaft 46.

In the position shown, the arm 45 is in an intermediate position in which the contacts 47—49 and 48—50 are out of engagement.

Assume that the bimetal 27 has a certain given stress, which may be zero or in compression or tension, and that the temperature is not changing. The flexible contact carrying arm 45 will be in the intermediate position shown providing the currents in the symmetrically disposed coils 62 and 63 are such that the net torque on the shaft 46 due to the cores 64 and 65 balances the torque due to the thermostat stress.

The given stress may be assumed to be due to the existence of temperature corresponding to that of the indicator 28. And it may be assumed that the balanced position of the shaft 46 corresponds to a zero or stable position of the operator, i. e., one in which no heating or cooling in the space is caused by the setting of the operator.

Assume now that the bimetal cools. The bracket 52 moves the arm 45 to cause clockwise movement of the arm 45 about the axis 53 of the shaft 46 until the contacts 47 and 49 engage. When they engage, the motor operated pump 16 is energized, and the piston 12 travels downwardly. This corresponds, for example, to opening movement of a valve controlling the flow of fuel to a furnace. As the operator 11 moves downwardly, the potentiometer tap 77 cuts out of circuit relationship with the coil 62 some of the resistance of the potentiometer resistance 78. More current is accordingly supplied to the coil 62. The operator 11 moves downwardly until the increased current in the coil 62 provides torque sufficient to overpower the bimetal 27 and moves the arm 44 away from contacting position. The bimetal 27 as well as arm 45 are accordingly stressed an additional amount if the given stress was zero or contraction, or stressed that incremental amount less if the given stress was due to expansion. When the contacts 47 and 49 are broken, the energization of the pump 16 is interrupted and the load actuator is stopped. The extent that the operator 11 moves downwardly depends upon the movement necessary to move the bimetal 27 back to a position where contacts 47, 49 separate. Accordingly, the operator 11 is positioned in proportion to the deviation from the desired temperature.

The position of the load determined at the new position of the operator 11 may be sufficient or insufficient to increase the temperature of the space in which the bimetal 27 is located. The position of the load constitutes merely a first approximation as to the needs of the system. Assuming heating now results, the bimetal stress tends to return towards its given condition; i. e., the bracket 52 tends to move to the left. The net torque then acting on the arm 45 may cause the contacts 48—50 to move into engagement. This may take place, for example, when half the temperature differential from the desired norm has been corrected or when only half the additional stress remains. Engagement of contacts 48 and 50 causes energization of the relay 44 and opening of the relief port 19. The piston 12 accordingly moves upwardly. This cuts an increasing amount of resistance into the circuit for the coil 62. When the actuator moves upwardly a sufficient amount, the arm 45 will be pulled away from contacting position due to the decreased current in the coil 62, and the load is now positioned for a smaller rate of heating or a rate of heating corresponding to the now reduced stress required to keep the bimetal in a neutral position. If the first approximation for heating is insufficient to raise the temperature, the contacts 47—49 will be again engaged, resulting in a greater heating rate.

The bimetal 27 expands or contracts rather slowly and the adjustments of actuator 11 as above described occur in intermittent steps until an ultimate balance is attained, corresponding to the initial position of the actuator and the first given stressed condition of the bimetal.

By appropriate calibration of parts in the system, the normal stress in the bimetal may be substantial, ensuring stress in one direction in the bimetal throughout all operations. Hysteresis effects are avoided. Otherwise, the actual amount of normal stress is uncritical.

From the consideration of the foregoing analysis, it can be appreciated that heat is supplied at a rate dependent upon the deviation from the desired norm and a proportional corrective control is effected. Obviously the system can be used in connection with a refrigerating mechanism alone or in connection with a heating mechanism alone or, optionally, the actuator or operator 11 may operate valves in a continuous range corresponding to operation of a cooling mechanism and operation of a heating mechanism. Proportional control of this character achieves very substantial stability.

The control system as thus far described operates to achieve a condition in which the bimetal 27 occupies a neutral position with a given or normal stress, corresponding to the zero or stable position of the actuator 11. Should the shaft 28 be rotated in either direction, as by manipulation of the dial drum 28, the temperature corresponding to the given stressed condition will be changed accordingly. For example, should the shaft 28 be rotated in a counterclockwise direction about its axis, the contacts 47 and 49 engage, and a higher temperature, depending upon the extent of movement of the shaft, will be required before the bimetal 27 is stressed to its initial extent corresponding to the load actuator 11 being at its zero or stable position.

The potentiometer 71 makes possible in effect a remote setting of the bimetal 27.

Movement of the tap 71 in a counterclockwise direction to the dotted-line position lowers the current to the coil 62 and increases the current to the coil 63. The contacts 47 and 49 are caused to engage. The pump 16 is energized, and the actuator 11 moves downwardly until the current in coils 62 and 63 produces counterbalancing torques. This corresponds to an increased rate of heating. Shortly, the bimetal 27 expands due to the increased heating, and the actuator 11 moves upwardly. Finally, the actuator 11 returns to its zero load or stable position, but a certain additional stress, depending upon the setting of the tap 71, is required to supplement the reduced torque of the coil 62. This additional stress corresponds to an increased temperature setting.

Adjustment of the tap 71 thus serves effectively to adjust the setting of the bimetal 27 in a manner essentially identical to moving the shaft 28 or dial drum 28a. Remote setting of the bimetal 27 is thus accomplished.

The apparatus may be calibrated so that the central position of the tap 71 determines the temperature directly indicated by the setting of the drum 28a. The potentiometer structure 69—70—71 can carry scale indications corresponding to degrees of cooling and degrees of heating with respect to the setting of the thermostat drum 28a.

Clock controls of thermostats have become increasingly popular. Thus, it may be desired that the bimetal 27 determine a temperature of 60° during certain portions of the day and an increase of 10° be provided during other portions of the day. It may also be desirable to change the temperature setting at any time. Clock-operated mechanisms or timers can be used for such functions in connection with the remote control potentiometer 69—70—71.

To accomplish this purpose, the potentiometer arm 71 is adjusted, such as to the dotted-line position, to provide, for example, an increase of 10 degrees. A timer mechanism and a relay structure 80 cause the tap 71 to be effective for a given interval of time but ineffective at other times for the purpose of modifying the energization circuits for the coils 62 and 63. For this purpose, a connection 81 is permanently connected to the mid-point of the potentiometer resistors 69 and 70 and is connected to a back contact 82 engaged by one contact arm 83 of the relay structure when the relay structure is deenergized.

A connection 84 connects the arm 83 to the line $L_2$ through the double throw switch 74 which is moved to engage an alternate contact 85. The conductor 72 connected to the tap 71 is connected by a conductor 86 to a second contact arm 87 of the relay structure and is normally out of engagement with the front contact 88 of the relay structure. Movement of the double throw switch 74 to the dotted-line position interrupts direct connection of the line $L_2$ to the potentiometer arm 71.

When the relay 80 is deenergized, energization circuits are established for the coils 62 and 63 in the following manner:

For the coil 63: line $L_2$, connection 37, switch arm 74, contact 85, connection 84, relay arm 83, back contact 82, connection 81, the entire element 69 of the potentiometer, fixed resistance 68, connection 67, coil 63, flexible connection 58, connections 59 and 31 to line $L_1$.

The energization circuit for the other coil 62 is established as follows: line $L_2$, connections 38 and 37, switch arm 74, contact 85, connection 84, relay switch arm 83, back contact 82, connection 81 all of the potentiometer elements 70, connection 79, part of the potentiometer resistance 78, tap 77, flexible connection 76, connection 75, coil 62, flexible connection 58, connections 59 and 31 to line $L_1$.

In this condition, the tap 71 is ineffective. The relay 80 has a coil 89 that has an energization circuit as follows: line $L_1$, connection 31, connection 32', coil 89, connection 90, timer-operated switch arm 71, connection 92, contact 85, switch arm 74, connections 37 and 38 to line $L_2$.

The timer mechanism 93 closes the switch arm 91 and establishes the energization circuit for the coil 89. When the coil 89 is energized, the relay arm 83 disengages the back contact 82, and the connection 81 to the fixed center tap of the potentiometer 69—70 is thus rendered ineffective. However, the variable tap 71 is made effective and the energization circuits for the coils 62 and 63 are completed with different values of resistance in their energization circuits as determined by the position of the variable tap 71.

The circuit for the coil 63 can be traced as follows: line $L_1$, connections 31 and 59, flexible connection 58, coil 63, connection 67, fixed resistance 68, part of the potentiometer element 69 determined by the tap 71, tap 71, connections 72 and 86, relay contact arm 87, front contact 88, connection 90, timer-operated switch arm 91, connection 92, contact 85, switch arm 74, connections 37 and 38 to line $L_2$.

The energization circuit for the coil 62 can be traced as follows: line $L_1$, connections 31 and 59, flexible connection 89, coil 62, connection 75, flexible connection 76, tap 77, potentiometer resistance 78, connection 79, potentiometer element 70 and part of the potentiometer element 69, tap 71, connections 72 and 86, relay switch arm 87, front contact 88, connection 90, timer-operated switch 91, connection 92, contact 85, switch arm 74, connections 37 and 38 to line $L_2$.

When the timer 93 is operative, therefore, the tap 71 determines an increased temperature setting of the bimetal 27. When the timer mechanism 93 operates to open the switch 91, the central tap, as at the connection 81, is again effective. Changed temperature settings accordingly can be achieved for certain time intervals.

The inventors claim:

1. In a follow-up control system, including a load actuator, electrically operable means for moving the actuator in opposite directions, a circuit controller having an arm movable to opposite contacting positions that are respectively effective to oppositely operate said electrically operable means, condition responsive means influencing the position of the arm, first electromagnetic means for urging the arm toward one contacting position, second electromagnetic means for urging the arm toward the other contacting position, the combination therewith of: a potentiometer having a resistance and two taps, one of said taps being adjustable; a circuit for said first electromagnetic means including one end of said potentiometer resistance and one of said taps; a circuit for said second electromagnetic means including the other end of said first potentiometer resistance, said one tap and a second potentiometer the resistance of which changes in accordance with the position of the actuator; the other tap paralleling said one tap; a switch movable between two positions; and timer means operable at one position of said switch for making said other tap effective at one time and said one tap effective at another time; said one tap being continuously operable when said switch is at its other position.

2. In a follow-up system: a rotatable structure, including a shaft mounted for rotation about its axis, a contact arm carried by the shaft and extending radially therefrom, and a pair of electromagnetic core members carried by the shaft; relatively stationary coil means cooperable with the core members; the core members being so disposed that energization of the respective coil means produces opposing torques upon said shaft; a condition-responsive device having a part movable in accordance with a condition, and capable of storing energy upon restraint of said part; a mechanical connection between said part and said arm; relatively stationary contact means cooperable with the arm respectively upon opposite movement of the arm; a reciprocable device; circuit means respectively including said contact means for oppositely moving said device; and circuit means including a circuit element in follow-up relationship to said device for energizing said coil means.

3. In a follow-up system: a rotatable structure, including a shaft mounted for rotation about its axis, a contact arm carried by the shaft and extending radially therefrom, and a pair of electromagnetic core members carried by the shaft; relatively stationary coil means cooperable with the core members; the core members being so disposed that energization of the respective coil means produces opposing torques upon said shaft; a condition-responsive device having a part movable in accordance with a condition, and capable of storing energy upon restraint of said part; a mechanical connection between said part and said arm; means adjusting the position of said condition-responsive device to vary the force exerted by said part; relatively stationary contact means cooperable with the arm respectively upon opposite movement of the arm; a reciprocable device; circuit means respectively including said contact means for oppositely moving said device; and circuit means including a circuit element in follow-up relationship to said device for energizing said coil means.

References Cited in the file of this patent

UNITED STATES PATENTS

| 1,876,636 | Dicke | Sept. 13, 1932 |
| 2,143,210 | Ray | Jan. 10, 1939 |
| 2,219,147 | Binder | Oct. 22, 1940 |
| 2,488,780 | Ray | Nov. 22, 1949 |
| 2,564,120 | McLean | Aug. 14, 1951 |

FOREIGN PATENTS

| 196,291 | Switzerland | Feb. 28, 1938 |